Nov. 14, 1944.  D. E. F. CANNEY ET AL  2,362,881

APPARATUS FOR COATING TEXTILE HOSE

Filed Feb. 9, 1942

Patented Nov. 14, 1944

2,362,881

UNITED STATES PATENT OFFICE 2,362,881

APPARATUS FOR COATING TEXTILE HOSE

Duncan Edward Farmar Canney and Mark Balkin, Bentham, Lancaster, England, assignors to The Sillick Holding Company Limited, Newcastle-upon-Tyne, England Application February 9, 1942, Serial No. 430,149 In Great Britain February 10, 1941

4 Claims. (Cl. 91—30)

The present invention has for its object to reduce or eliminate the porosity of fire hose and other textile hoses.

Textile hose initially leaves the loom in a flattened form, and when laid out assumes a more or less flat shape, the cross section varying in shape from point to point along the length of the hose.

The invention provides an apparatus for rendering a textile hose non-porous, or nearly so, which consists of a spreader for traversing along the hose, thereby both expanding the hose to a shape conforming with the cross-section of the spreader and, by extruding a layer of sealing agent through the peripheral gap between the spreader and the hose, applying to the interior of the hose, while so expanded, a lining of sealing agent of substantially uniform thickness which is continuous both longitudinally and circumferentially.

The spreader may be formed in two parts, namely a rigid or nearly rigid front part serving as an opener to expand the hose, and a rear part serving as a distributor, which conforms in shape to the shape to which the hose has been opened by the opener, distributes the sealing agent over the interior of the hose and determines the thickness of the lining. Thus the opener may be constituted by a hollow body containing a supply of rubber latex, and the distributor by a plate, having a cross-section smaller than but of the same shape as that of the front part, the latex passing out between the front and rear parts as the spreader is drawn or pushed through the hose. With this arrangement, the distributor should follow sufficiently closely behind the opener to enable it to operate on the hose before the latter has time to lose the shape given to it by the passage of the opener.

The spreader need not necessarily be of circular section, but may be of any other convenient section, for example oval or elliptical, which will enable a uniform lining of sealing agent to be applied to the hose. The spreader may conveniently be slightly enlarged at the portions which traverse the selvedges of the hose to avoid any tendency of sealing agent to accumulate there.

Figure 1:
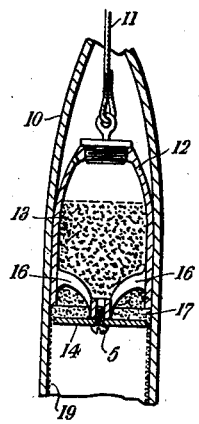
Figure 2:
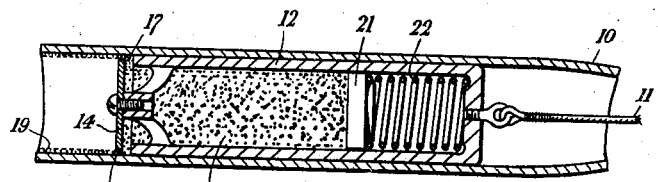

In the accompanying drawing, Figures 1 and 2 are respectively longitudinal sections through two alternative forms of spreader according to the invention, showing the same in position within the hose.

In Fig. 1 is shown an arrangement in which the spreader is formed in two parts, namely an opener which serves to expand the hose from a flattened form to a cross section conforming with that of the opener, and a distributor, following the opener, which serves to distribute the latex over the interior of the hose in the form of a continuous lining of substantially uniform thickness. It is necessary that the opener should be rigid or nearly rigid, since it must produce a cross-sectional shape in the hose corresponding to that of the distributor which follows after it. The spreader which is drawn vertically through the hose 10 by the string 11, consists of two parts and the opener is constituted by a hollow rigid cylinder 12, of circular section but tapered at its forward end. The cylinder 12 contains a supply 13 of rubber latex, and serves, as it passes through the hose, to open it from the flattened form into a rounded form. Immediately to the rear of the cylinder 12 is located the distributor, which is constituted by a circular plate 14, of slightly smaller diameter than the cylinder. The plate 14 is secured by a screw 15 to supporting members 16 attached to the cylinder, and serves to spread the latex, which escapes through the annular gap 17 between the cylinder and plate, over the interior of the hose. The latex, being extruded through the peripheral gap 18 between the plate and the hose, (which has, as explained above, been opened to rounded form by the passage of the cylinder) is distributed over the internal surface of the hose to form the lining 19 of substantially uniform thickness.

In the arrangement shown in Fig. 2 the spreader is again composite. The front portion or opener is constituted by a hollow cylinder 12, open at its rear end and containing rubber latex 13 and a pressure device, constituted by a plate 21 pressed in a rearward direction by a spring 22. The distributor consists, as in the case of Fig. 1, of a circular plate 14 secured to and spaced slightly to the rear of the cylinder 12. When this arrangement is drawn through the hose, the rubber latex will be forced out through the gap 17 between the rear end of the cylinder and the plate, and spread by the plate over the inner surface of the hose to form the lining 19.

After the spreader has been traversed through the hose, the latex can be dried and vulcanised by any convenient known method. Alternatively a pre-vulcanised latex can be used, in which case subsequent vulcanisation is of course unnecessary.

Although we have so far referred to the spreader being traversed along the hose by maintaining the hose stationary, and pulling or pushing the spreader through it, the reverse arrangement may, however, be adopted in suitable cases, the spreader being held stationary and the hose drawn past it. The word "traversing" as used in the appended claims is to be understood as including this reverse arrangement.

It has been proposed to cover the inside of flexible hose with rubber by strongly stretching it throughout its length to make it assume its natural rounded form, introducing a supply of liquid rubber between two spaced disc-like brushes connected together by a rod, and forcing the brushes through the hose by compressed air, a springy cup and a rigid disc being placed behind one of the brushes, the rigid disc constituting a piston to receive the air pressure and the compressed air serving not only to drive the brushes through the hose but also to force the rubber into the pores of the fabric of the hose. The present invention does not involve the use of any means additional to the spreader for causing the hose to assume a rounded form. On the contrary the spreader itself serves both to open the hose and to form, solely as a result of its passage through the hose, a continuous and substantially uniform lining of sealing agent on the interior of the hose. A brush could only be effective to spread a uniform layer of rubber over the internal surface of the hose if the hose were caused to assume a more or less exactly rounded form before the brush is introduced. If the brush were forced through a fire hose with the latter in the flattened condition, the effect could only be to open it to a roughly elliptical shape, but then the bristles facing in the direction of the minor axis would be bent back while there would be a wide gap left between the hose and the bristles facing in the direction of the major axis. The layer of rubber distributed by the brush could not therefore be of even approximately uniform thickness.

Although we do not exclude the use of compressed air, in suitable cases, for driving the spreader along the hose, it will be understood that the compressed air would be used at the comparatively low pressure required to move the spreader and not at the very much higher pressure which would be needed if it were intended to force into the pores of the fabric of the hose the lining deposited on it by the spreader.

While we have referred above to the use of rubber latex, it will be understood that we may use instead any other sealing agent, which can be applied to the hose in a liquid or plastic condition and will subsequently dry to a flexible solid which will form a lining for the hose, for example solutions of natural or synthetic rubber in organic solvents or cellulose derivative compositions, such as cellulose acetate compositions. The expression "sealing agent" as used in the appended claims is to be understood as including any material conforming with the above definition.

Owing to the reduction in or elimination of the porosity of the hose by the lining, the invention renders it possible to use, as fire hose, cotton hose pipes and hoses made of other materials, which, of themselves, would be unsuitable for the purpose owing to their great porosity.

What we claim as our invention and desire to secure by Letters Patent is:

1. A device for applying a uniform coating agent to a normally flattened textile hose, which comprises a hollow, rearwardly open cylindrical plug for expanding the hose to rounded form, said plug constituting a container for the sealing agent, a thin circular spreader plate mounted immediately in rear of the plug with its plane at right angles to the axis of said plug, and spacing means connecting the plug and plate and maintaining the plate in positive alignment with the plug to define between them a narrow circumferential gap for egress of sealing agent contained in the plug, the radius of said plate being slightly smaller than the radius of said plug.

2. A device for applying a uniform internal coating of sealing agent to a normally flattened textile hose, which comprises a hollow, rearwardly open plug of rounded section for expanding the hose to rounded form, said plug constituting a container for the sealing agent, a thin spreader plate mounted immediately in rear of the plug with its plane at right angles to the axis of said plug, spacing means connecting the plug and plate for maintaining the plate in positive alignment with the plug to define between them a narrow circumferential gap for egress of sealing agent contained in the plug, a plunger in the plug and a spring urging said plunger rearwardly to express sealing agent outwardly through said gap, the plate being shaped to conform with the section of the plug but being slightly smaller than said section to permit of rearward flow of sealing agent past said plate to form a uniform coating on the hose.

3. A device for applying a uniform coating agent to a normally flattened textile hose, which comprises a hollow, rearwardly open cylindrical plug for expanding the hose to rounded form, said plug constituting a container for the sealing agent and having a tapered nose at its forward end, a thin circular spreader plate mounted immediately in rear of the plug with its plane at right angles to the axis of said plug, and spacing means connecting the plug and plate and maintaining the plate in positive alignment with the plug to define between them a narrow circumferential gap for egress of sealing agent contained in the plug, the radius of said plate being slightly smaller than the radius of said plug.

4. A device for applying a uniform internal coating of sealing agent to a normally flattened textile hose, which comprises a hollow member of rounded external contour for expanding the hose to a corresponding rounded form, a thin spreader plate mounted immediately in rear of said opener member with its plane at right angles to the axis of said member, and spacing means connecting the opener member and the plate for maintaining the plate in positive alignment with the opener member to define between them a narrow circumferential gap for egress of sealing agent flowing rearwardly through the opener member as the latter traverses the hose, the plate having a contour corresponding to but slightly smaller than that of the opener member to permit of rearward flow of sealing agent past said plate to form a uniform coating on the hose.

DUNCAN EDWARD FARMAR CANNEY.
MARK BALKIN.